United States Patent
Troczynski et al.

(12)

(10) Patent No.: US 6,284,682 B1
(45) Date of Patent: Sep. 4, 2001

(54) PROCESS FOR MAKING CHEMICALLY BONDED SOL-GEL CERAMICS

(75) Inventors: Tomasz Troczynski; Quanzu Yang, both of Vancouver (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/383,074

(22) Filed: Aug. 26, 1999

(51) Int. Cl.$^7$ .................................................. C04B 35/01
(52) U.S. Cl. .......................... 501/12; 501/111; 501/118; 501/127; 501/128
(58) Field of Search ................................. 501/127, 128, 501/118, 12, 111

(56) References Cited

U.S. PATENT DOCUMENTS

| | | | | |
|---|---|---|---|---|
| 4,212,680 | * | 7/1980 | Schulz | 501/127 |
| 4,231,984 | * | 11/1980 | Hofman | 264/256 |
| 4,459,156 | * | 7/1984 | Henslee et al. | 501/118 |
| 4,542,089 | * | 9/1985 | Cadwell et al. | 430/276 |
| 4,614,673 | * | 9/1986 | Bendig | 427/376.2 |
| 5,190,899 | * | 3/1993 | Sutor | 501/127 |
| 5,585,136 | * | 12/1996 | Barrow et al. | 427/2.24 |
| 6,013,592 | * | 1/2000 | Merrill et al. | 501/127 |

* cited by examiner

*Primary Examiner*—Karl Group
(74) *Attorney, Agent, or Firm*—Oyen, Wiggs, Green & Mutala

(57) ABSTRACT

This invention relates to a novel method of decreasing porosity of ceramics produced by sol-gel processing. The process of preparing chemically bonded sol-gel ceramics comprises phosphating a sol-gel derived oxide or hydrated oxide and polymerizing the phosphated product with heat treatment. Such combined sol-gel/chemical bonding process can be used to fabricate dense, thick ceramics or ceramic coatings for a variety of applications, including high temperature corrosion protection, wear resistance, dielectric properties, non-sticky surfaces, bio-active ceramics, thermal barrier ceramics, non-wetted surfaces, and others.

7 Claims, 3 Drawing Sheets

PROCESS FOR MAKING CHEMICALLY BONDED SOL-GEL CERAMICS

FIELD OF THE INVENTION

This invention relates to a novel method of decreasing porosity of ceramics produced by sol-gel processing. More particularly, the invention pertains to novel process of preparing chemically bonded sol-gel ceramics by phosphating a sol-gel derived oxide or hydrated oxide and heat treating the phosphate treated oxide or hydrated oxide.

BACKGROUND OF THE INVENTION

Ceramic coatings can be prepared by thermal or plasma spraying and physical vapour deposition (PVD) techniques, among others. In plasma spray, a bulk powder is passed through a plasma and directed towards a substrate where it cools on contact. Films up to about 10 mm thick can be produced in this way but usually need post-deposition treatment by organic or ceramic sealants, as the deposited film tends to be porous. For example, French Patent No. 2,683,813, published Jun. 21, 1993, discloses a process for reducing porosity of plasma deposited alumina ceramic materials by using orthophosphates. The ceramic materials are formed of alumina or oxides of magnesium, or titanium dioxide. The process relates to plasma deposited ceramic technology and not sol-gel technology.

E. Kumpulainen, et al., in a paper entitled "Characteristics of Phosphoric Acid Sealed Ceramic Oxide Coatings", published 1996, discloses that phosphoric acid can be used as a sealing material for thermally sprayed alumina, chromia or zirconia coatings. K. Niemi, et al., in a paper entitled "Thermally Sprayed Alumina Coatings with Strongly Improved Wear and Corrosion Resistance", published Jun. 20, 1994, discloses that aluminum phosphate can be used in sealing the surface of thermally sprayed alumina coatings. Again, this paper relates to thermally sprayed ceramic coatings, and does not employ sol-gel technology.

Porosities of higher than 10% are not uncommon in thermal sprayed coatings. Exception is Thermal Barrier Coating, where 10%–15% porosity is beneficial in decreasing thermal conductivity of the coating. Another drawback of the plasma spray technique is that only line of sight geometries can be successfully coated. In PVD techniques, expensive vacuum systems are required to coat high quality ceramic films of less than 10 microns in thickness. This technique is also limited to line of sight geometries.

In recent years, an alternative method, called sol-gel processing, has become promising for deposition of ceramic coatings. A sol is a dispersion of solid particles in a liquid phase where the particles are small enough to remain suspended indefinitely by Brownian motion. For aqueous sols, this means a particle size less than approximately 0.1–1 $\mu$m. A gel is a solid containing a liquid component in an internal network structure so that both the liquid and solid are in highly dispersed state. In the highly viscous gel state, material can be shaped into a useful product, e.g. bulk shape, fibre, coating, etc. In order to produce a high quality, pure sol, frequently organo-metallic precursor compounds of the desired ceramic oxides are mixed and dissolved in a suitable solvent. The resultant solution is then hydrolyzed to form a nano-cluster sol, and subsequently a gel composed of organo-metallic polymers or macro clusters. Additives can be added to control the viscosity and surface tension of the sol-gel. Films are prepared by either spin, dip or spray coating, or painting onto an appropriate substrate. The coated substrate is then fired to remove the water and organic material and to develop the final ceramic structure. The sol-gel process has several advantages over other fabrication methods. It is simple, more economically feasible and permits coating of complex geometries, not necessarily limited to line of sight.

U.S. Pat. No. 4,614,673 discloses the use of aluminum isopropoxide or aluminum secondary butoxide for the sol-gel ceramic deposition on a substrate. This patent discloses that a gelled film can be deposited directly on a sensitive substrate to obtain protective ceramic coating on the substrate. An alumina sol, for example, can be sprayed through a flowing stream of ammonia to create a uniformly thick film, which adheres to metals, plastics, or, in some cases, water soluble materials. The film can then be cured, usually at relatively low firing temperatures, to complete the coating. One specific method for forming a protective alumina coating on the surface of the sensitive substrate, such as on a metal, a metal matrix composite or a plastic which is not wet by a conventional alumina sol, comprises the steps of (a) spraying an alumina sol containing alumina in isopropanol on the surface through a flowing stream of anhydrous ammonia to deposit a gelled film directly on the surface; (b) continuing the spraying to build up a substantially uniform film of the desired thickness; and (c) drying and curing the film at a temperature between 200 and 600° C. to complete the protective alumina coating.

In the field of ceramics, sol-gel processing offers many advantages over conventional ceramic processing, including high purity, homogeneity and low sintering temperatures of the ceramics. However, ceramics produced by this sol-gel process have a number of limitations which restrict the use of such ceramics for corrosion and wear protection. Such problems include cracking, weak bonding between coating and substrate, and permeability to gases and liquids.

Some of these problems have recently been partially addressed in an application of modified sol-gel technology for deposition of thick ceramic coatings by Barrow et al., U.S. Pat. No. 5,585,136, granted Dec. 17, 1996, which discloses a method for producing thick ceramic films of greater than 10 microns on selected substrates. Conventional sol-gel solutions are loaded with up to 90% by weight of finely divided ceramic particles and mixed. The resulting slurry or paint can be either spun or dip-coated or sprayed or painted onto a planar or other substrate, fired to remove the organic materials and to develop a microcrystalline structure. The fired film may then be heated. Composite films are also contemplated. The thicker coatings do not crack upon drying because the gel phase contains up to about 90% weight of the filler calcine ceramic. However, although the coatings were heat treated at temperatures up to 1000° C., residual porosity persisted, giving relatively low hardness and high permeability to liquids.

In order to exploit the desired properties of the ceramic, it is essential that the ceramic film be dense, not permeable to gases and liquids, and crack-free. Sol-gel films are, however, very susceptible to substrate interaction, and defects and stresses within the film coating. As a general rule, the thinner the film, the lower the internal stresses and the number of defects.

SUMMARY OF INVENTION

In this invention, the inventors disclose that chemical bonding through phosphating of sol-gel derived oxides or hydrated oxides leads to dense, hard, wear and corrosion resistant ceramics for variety of applications, including coatings and bulk components. In the case of coatings, the bonding is achieved after heat treatment at temperatures as low as 300° C., without chemically attacking the substrate by the phosphates. The key phenomenon of the disclosed process is the reactivity of the fine sol particles with phosphate precursors. The inorganic products of this reaction polymerize and form complex phosphates, which may crystallize at elevated temperatures. Such combined sol-gel/chemical bonding process can be used to fabricate dense, thick, low permeability ceramics or ceramic coatings at relatively low temperatures, for a variety of applications, including providing high temperature corrosion protection, wear resistance, dielectric properties, non-sticky surfaces, non-wetted surfaces, thermal barrier ceramics, bio-active ceramics, and others.

The invention is directed to a process of preparing a chemically bonded sol-gel ceramics comprising phosphating a sol-gel derived oxide or hydrated oxide ceramic with heat treatment at a temperature between about 300° C. and about 1200° C.

The sol-gel derived oxide or hydrated ceramic oxide can be a first phase and can be impregnated with a secondary phosphate phase which can react with the sol-gel ceramic first phase. In one embodiment of the invention, a mixture of calcined alumina and sol-gel derived alumina can be impregnated with a mixture of metal phosphate and phosphorus acid to form complex amorphous phosphates which can crystallize under heat treatment. In another embodiment of the invention, porosity in the surface of the ceramic coating can be sealed by utilizing a process selected from the group consisting of sol-gel impregnation, sol-gel electrophoretic deposition, aluminum phosphate impregnation, phosphorus acid impregnation, or a combination of these treatments.

The hydrated ceramic oxide can be one or more of $SiO_2$, $Al_2O_3$, $ZrO_2$, $TiO_2$, BeO, SrO, BaO, CoO, NiO, ZnO, PbO, CaO, MgO, $CeO_2$, $Cr_2O_3$, $Fe_2O_3$, $Y_2O_3$, $Sc_2O_3$, $HfO_2$ or $La_2O_3$. The phosphating agent can be a metal phosphate, phosphoric acid, or mixtures thereof. The metal in the phosphate can be one or more of Al, Zr, Ti, Mg, Cu, Fe, Ca, Sr, Hf or Cr. The process can include a calcined ceramic filler comprised of powders or fibres of oxides, carbides, nitrides, borides, suphides or mixtures thereof.

The invention is also directed to a process of preparing a chemically bonded sol-gel ceramic coating deposited on a substrate comprising phosphating a sol-gel derived oxide or hydrated oxide ceramic deposited on the substrate for sufficient time to seal pores in the ceramic, but for insufficient time to attack the substrate, and polymerizing the resulting product with heat treatment at a temperature between about 300° C. and about 1200° C.

The invention also pertains to a method of preparing a ceramic sol-gel coating on a substrate which comprises: (a) immersing a substrate coated with a ceramic sol-gel coating into an alumina sol; (b) withdrawing the ceramic sol-gel coated substrate from the alumina sol and drying the coated substrate at a temperature of about 100° C.; (c) heat treating the dried coated substrate at a temperature of about 550° C. for about 10 min.; (d) applying a phosphoric acid solution on the surface of the ceramic coated substrate to seal the pores in the ceramic coating for sufficient time that permits the hydrated alumina sol to react with the phosphoric acid solution sufficiently rapidly to seal pores in the ceramic coating, but for insufficient time that the underlying substrate is exposed to substantial phosphating reaction; and (e) heating the phosphoric acid treated ceramic coated substrate at a temperature of about 600° C.

The phosphoric acid can be reacted with the hydrated alumina sol coating at about 300° C. for about 20 minutes. The reaction of the phosphoric acid with the hydrated alumina sol ceramic coating can yield a polymerized network of mono-aluminum phosphate within the coating and on the surface of the coating.

The invention is also directed to a method of preparing an alumina/alumina composite sol-gel ceramic coating on a substrate which comprises hydrolyzing aluminum isopropoxide solution in water at a pH of 3 to 5 to produce hydrated alumina sol, dispersing calcined aluminum oxide in the sol suspension, agitation the suspension to produce a homogenous slurry, immersing a substrate in the slurry to coat the substrate, drying the composite sol-gel coating at a temperature of 50 to 400° C. and densifying the coating at 400 to 900° C. Other ceramic particles, such as zirconia particles can be substituted for the calcined aluminum oxide. The porous coating resulting from this process is then sealed using chemical bonding process through phosphating, as described above.

The invention also pertains to a method of sealing porosity of ceramic coatings comprising impregnating the porous ceramic coating with mono-aluminum phosphate for about 10 to 50 min., and heating the impregnated coatings at a temperature of about 300° C. for about 20 to 50 min. The product may be further heat treated at temperatures of 500 to 800° C. for about 10 to 50 min to crystallize the polymerized complex glassy phosphases resulting from the reaction.

The invention also includes a method of sealing a composite sol-gel ceramic coating produced from alumina sol, alumina composite sol or mono-alumina phosphate sol, which comprises reacting the hydrated alumina sol, alumina composite sol or mono-alumina phosphate sol with phosphoric acid to create a polymerized network of mono-aluminum phosphate in the ceramic coating, without exposing the substrate to damaging phosphating reaction.

The invention also includes a method of sealing a composite sol-gel ceramic coating on a substrate with phosphoric acid which comprises treating the coating with phosphoric acid for about 1 to 20 min., polymerising the resulting product at a temperature of about 300° C. for 20 to 50 min., and then further treating the coating at temperatures of 500 to 800° C. for about 10 to 50 min.

The invention is also directed to a process for producing a porosity sealed ceramic film on a substrate comprising: (a) mixing a sol-gel solution with a metal oxide ceramic powder to produce a mixed slurry; (b) applying said mixed slurry to a substrate to thereby coat the substrate with the ceramic sol-gel slurry; (c) heating the ceramic sol-gel coated substrate at a temperature up to about 600° C. to 1000° C. to produce a ceramic metal oxide film on the substrate; and (d) sealing surface pores of the ceramic coating with a phosphorus containing ceramic sealant.

The ceramic sealing process can be selected from the group of processes comprising sol-gel impregnation, sol-gel electrophoretic deposition, aluminum phosphate impregnation or phosphorus acid impregnation. The sol-gel solution can comprise aluminum isopropoxide and water. The treated aluminum isopropoxide sol coated substrate can be treated with phosphoric acid and the phosphoric acid can react with the alumina ceramic at a temperature of at least 300° C. for at least 20 min.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

General Principles and Characteristics

Figure 1A:
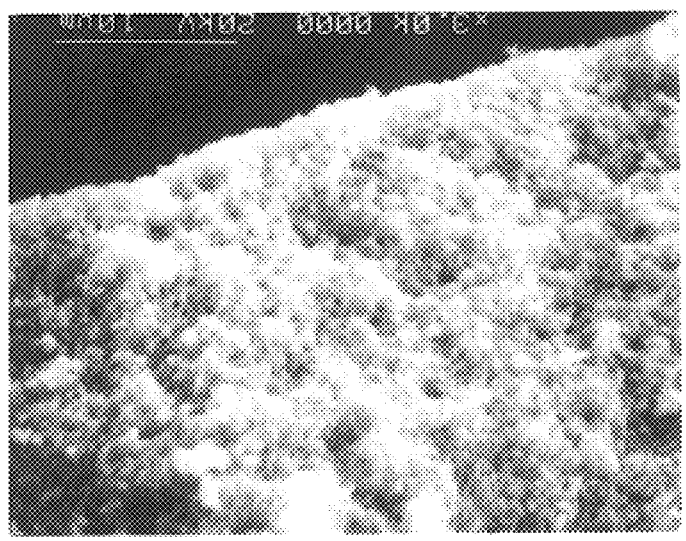
FIGS. 1A, 1B, 1C, 1D, 1E and 1F illustrate six SEM microstructures of several alumina/alumina CB-CSG (Chemically Bonded Composite Sol-Gel) coatings.
Figure 1B:
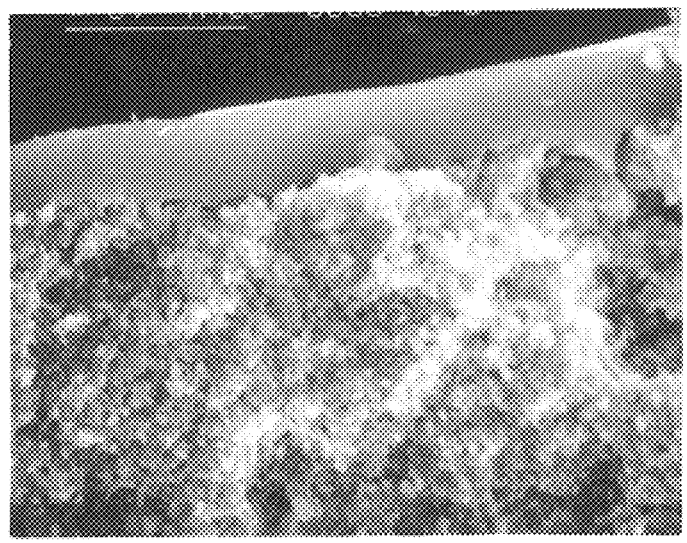
Figure 1C:
Figure 1D:
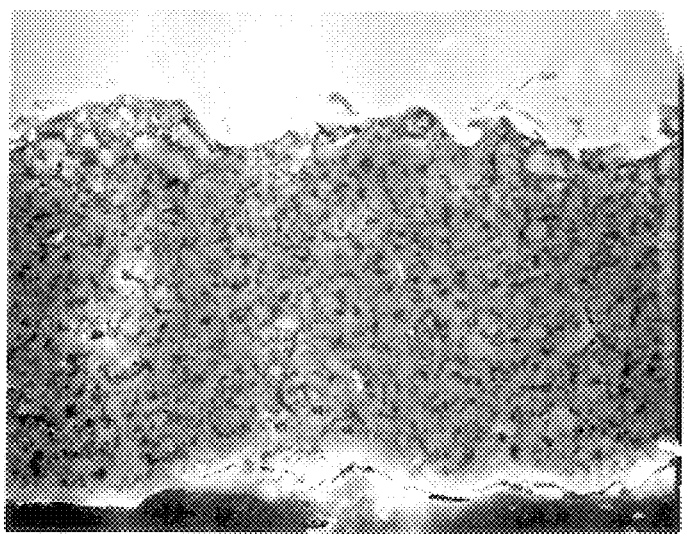
Figure 1E:
Figure 1F:

Sol-gel processing offers many advantages over conventional ceramic processing, including high purity, homogeneity, and low sintering temperature of the ceramics. The problems limiting the applications of ceramic sol-gel coating technology for corrosion and wear protection include cracking, weak bonding between coating and substrate, and permeability of the ceramic structure to gases and liquids (if porous). This problem has recently been partially addressed in the application of modified sol-gel technology for deposition of thick ceramic coatings (U.S. Pat. No. 5,585,136, Barrow et al., Queens University). Thicker coatings (up to 6 $\mu$m in single deposition and up to 200 $\mu$m in multiple depositions) evidently did not crack upon drying because the gel phase contained up to about 90% wt. of the filler calcined (i.e. not shrinking upon heat treatment) ceramic. However, even when the coatings were heat treated at temperatures up to 1000° C., residual porosity persisted, thereby giving relatively low hardness for the coating and a high permeability to liquids.

The inventors have discovered that this particular porosity and hardness problem can be addressed through use of a ceramic sealant by any of a number of techniques including sol-gel impregnation, sol-gel electrophoretic deposition, aluminum phosphate impregnation, phosphorus acid impregnation, and/or combinations of these treatments. For example, the hydrated alumina sol may be subject to reaction with phosphoric acid to result in a network of monoaluminum phosphate. This application is also suitable for enhancing structural integrity to porous bodies or coatings, for example, Thermal Barrier Coatings.

In a typical colloidal sol-gel ceramic process, the precursor material (either an inorganic salt or metal alkoxide solution) is chemically processed to form hydrous metal oxides or hydroxides. Colloidal dispersions (sols) are prepared by peptisation, while a gel is formed by dehydration or pH control.

Sol-gel processing includes aqueous-based processes that start from a solution of metal salt and alcohol-based processes that derive from a metal alkoxide. In the aqueous-based process, sol formation is accomplished by hydrolysis of the metal ions, i.e. $M^{n+} + nH_2O \rightarrow M(OH)_n + nH^+$. Gelation of the sol is accomplished by either the removal of water (dehydration gelation) or an increase in the pH (alkaline gelation). As water is removed during dehydration gelation, the energy barrier to gelation is reduced by the increase in electrolyte concentration in diffuse layer. In alkaline gelation, an increase in the pH reduces the magnitude of positive surface charge on the sol particles which, in turn, reduces the repulsive force between particles and lowers the height of the energy barrier.

The sol-gel coatings can be deposited by either spin-, dip-, or spray-coating a substrate, and firing the coated substrate to remove the organic component and eliminate porosity. The advantage of sol-gel is that it is a simple, cost effective process in which homogenous ceramic films are achieved at relatively low temperatures, for example, below 1000° C. A wide range of geometry and shapes can be coated, including out-of-sight geometry and concave shapes. However, since the conventional sol-gel films tend to crack, it is difficult to fabricate crack-free films greater than several microns in thickness. Dispersing particulates of calcined ceramics in the sol-gel matrix can prevent the large strain of the conventional sol-gel films which occur upon heat treatment and densification.

Compaction of the gelled film during drying, as driven by capillary pressure, is resisted by aggregation due to gelation. Since highly compacted films are desired (i.e. low overall porosity and pore size <1 nm in the dry film), some variants of the process gelation will be avoided during the film deposition (and initial drying stages). High dilution of the sols (e.g. <0.5 M/l) helps to achieve low-porosity thin films. Very high compaction may be achieved through electrophoretic deposition of the films of stable sol particles (i.e. at low pH).

Since colloidal (sol) particle compacts have very high surface energies, sintering can be done at temperatures well below their melting temperatures. High-purity raw precursors for gels, such as tetraethylorthosilicate (TEOS), that contain less than 100 ppb total impurity metals, yield high purity final ceramic products. Improved homogeneity of multicomponent species can be obtained by blending a variety of metal alkoxides, colloidal dispersions, or easily diffused soluble salts. The primary concerns are whether the reactivity of the various species can be controlled to produce the desired level of homogeneity, and whether that distribution can be retained throughout the remaining processing steps. The colloidal gel monoliths have, however, very small pore structures and relatively low densities. Removal of the solvents from these open networks and the overall shrinkage in processing requires special techniques to avoid cracking. In addition, thermal processing must take into account high surface water and carbonaceous residues that can lead to bloating, residual bubbles or crystal formation if not properly removed.

In order to overcome the high shrinkage problem of classical sol-gel processing, calcined ceramic powders or fibres (ceramic fillers) may be dispersed into sols to fabricate high performance composite sol-gel ceramics. The shrinkage of these bodies decreases because of the presence therein of the significant amount of inert ceramic powders or fibres. The additional advantages of sol-gel processing for ceramic composites are fine scale mixing and low densification temperature, leading ultimately to improved properties. This composite sol-gel technology can be used to fabricate crack-free thick ceramic coatings, up to several hundred $\mu$m thick, on metallic or nonmetallic substrates. Prior art knowledge shows however that these composite sol-gel coatings cannot be densified and gain enough strength and hardness if cured below about 1000° C. For most metallic substrates of interest, however, including aluminum and magnesium alloys, the maximum curing temperature must be below about 600° C. The subject invention solves this dilemma because it allows production of chemically-bonded, dense and hard composite sol-gel coatings on substrates or bulk ceramic components in this temperature range.

Chemical bonding (CB) through phosphating has been used in refractories and cements (dental as well as structural). Reaction bonding of alumina has also been used to produce ceramics of controlled, fine pore structure such as molecular sieves. Phosphating of steel or aluminium produces a thin (1–10 μm) mildly protective layer which can be utilised as a bondcoat for subsequent application of organic paints. In order to produce a phosphate-bonded ceramic, a chemical reaction is initiated between orthophosphoric acid ($H_3PO_4$) and an oxide (such as alumina, zirconia, chromia). As a result, refractory phosphates, such as aluminium phosphate, are formed. For example, for the system $Al_2O_3$—$H_3PO_4$—$Al(H_2PO_4)_3$, the reaction starts at 127° C., and is complete at about 500° C. At higher temperatures, the resulting glassy aluminophosphates undergo a chain of crystallization-phase transformations, to eventually decompose to $P_2O_5$ and $Al_2O_3$ above 1760° C.

The subject invention addresses the problems of cracking, weak bonding to a substrate and high porosity through use of a combination of sol-gel processing and chemical bonding of the sol-gel phase. The subject invention pertains to a ceramic sealing procedure wherein a sol-gel phase is impregnated with secondary phosphate phases which react with the sol-gel phase and bond the ceramic filler. One example of such a procedure is a mix of calcined alumina and sol-gel derived alumina (or hydrated alumina) networks, which is impregnated with a mix of metal phosphate and phosphorus acid. The phosphates and phosphorus acid react primarily with the sol-gel derived alumina (or hydrated alumina) networks to form complex amorphous phosphates, which can crystallize upon heat treatment above about 600° C. The hydrated alumina sol is subject to reaction with phosphoric acid to result in a polymerized network of monoaluminum phosphate. The phosphates also partially react with calcined alumina, thereby providing a strong bond between the alumina filler particles, and the continuous matrix phosphate phase.

In order to achieve the desired properties, the kinetics of the phosphating reaction must be controlled to prevent substantial reaction of the phosphate with the substrate, which is undesirable because it can lead to reaction product buildup at the interface and spallation of the coating. The kinetic reaction control is achieved through the use of a sol-gel phase with an inner ceramic filler, and phosphate phase, in proper ratio, particle size, and concentration across the coating.

The key discovery and hence know-how of the invention, therefore, is that the hydrated ceramic oxide sol reacts rapidly with the phosphates and/or phosphoric acid. In application of the invention to processing of ceramic coatings, the reaction is sufficiently rapid such that the underlying metallic substrate is not exposed to damaging phosphating reactions. By using the above processes, non-permeable and crack-free thick ceramic coatings (up to 500 μm thick) have been successfully fabricated on variety of substrates, including steel, Ti, Cu, Al, Mg, in simple painting/curing operation. The resulting coatings had bonding strength above 43 MPa, surface hardness above 6.4 GPa, and non-permeability to gases and liquids.

Ceramic coatings produced according to the subject invention can be used to produce:

(1) thick composite sol-gel ceramic coatings (up to 80 μm in single deposition, and up to 500 μm in multiple depositions) for high temperature wear and corrosion protection;
(2) dielectric coatings;
(3) thermal barrier coatings;
(4) bioactive coatings; and
(5) sealing porous ceramic coatings and bulk materials, for improved corrosion and wear resistance.

A principal application for the invention includes coatings for corrosion and wear protection of metallic or non-metallic substrates, especially in high temperature/abrasive/corrosive environments, such as pipelines.

Detailed Description of a Preferred Embodiment of the Invention

A new, generic method for deposition of low porosity ceramic coatings through Chemically Bonded Composite Sol-Gel (CB-CSG) technology is disclosed. CB-CSG is a novel process which is rooted in and an inventive combination of Sol-Gel technology (SG), newly proposed Composite Sol-Gel technology (CSG), and the known reactivity between phosphates and metal oxides or hydroxides.

In this invention, sols of oxides or hydrated ceramic oxides are utilised as a dispersing medium for calcined ceramic filler material, and as reactants providing chemical bonding to the resulting ceramic body, e.g. coating. The hydrated ceramic oxides include one or more $SiO_2$, $Al_2O_3$, $ZrO_2$, $TiO_2$, BeO, SrO, BaO, CoO, NiO, ZnO, PbO, CaO, MgO, $CeO_2$, $Cr_2O_3$, $Fe_2O_3$, $Y_2O_3$, $Sc_2O_3$, $HfO_2$ or $La_2O_3$.

The chemical bonding agents include metal phospates, phosphoric acid, or mixtures or suspensings of same liquid media, such as water organic liquids. The metal in the phosphates includes one or more of Al, Zr, Ti, Mg, Cu, Fe, Ca, Sr, Hf, Cr. The calcined ceramic filler material may include essentially any ceramic in any form, i.e. powders or fibres of oxides, carbides, nitrides, borides, sulphides or mixtures thereof.

General Example 1

In one example of the invention, alumina sol consisting of a homogeneous medium ($H_2O$, isopropanol, or their mix) and alumina colloidal particles dispersed therein is utilised. The hydrated alumina sol clusters are particles approximately 3–5 nm large. Aluminum isopropoxide $Al(OC_3H_7)_3$ in water (1 Mole per liter concentration) is used as a precursor of the binder phase for deposition of CB-CSG coatings. Hydration of this precursor in acidic environments (pH<4) leads to stable polynuclear cations (a few nm in size) of the formula:

$$[AlO_4Al_{12}(OH)_{24}(OH_2)_{12}]^{7+}$$

During processing, the solution is stirred constantly at 90–95° C. for 48 hours and then cooled to room temperature. The shelf life stability of this sol extends to several months at room temperature, thereby making it an ideal precursor for CB-CSG processing. Increasing the pH of 1M alumina sol to above 5 causes a rapid increase in the sol viscosity from 1.2 cps to more than $10^3$ cps due to the occurrence of polycondensation reaction s of the type =Al—O—H+H—O—Al==Al—O—Al+$H_2O$.

If 8 vol % alumina powder (~0.3 μm diameter uniform sphere) is homogeneously dispersed into 1 M alumina sol at pH=4, the average center distance between the particles is ~0.5 μm and the average surface distance of between the particles is ~0.2 μm. The ~3–5 nm colloid clusters that have a positive charge (+7), interact with positively charged $Al_2O_3$ particles, which positions them somewhere in between the larger alumina particles. The strong electrostatic repulsion dominates the particles-clusters interactions in the slurry and helps to reduce the coagulation of alumina.

For alumina/alumina coatings, the dispersed powders may include ~300 nm diameter calcined alumina α-$A_2O_3$ and/or ~30 nm diameter γ-$Al_2O_3$. The low viscosity CSG slurry is deposited on a substrate through dip-coating or spraying, following by heat treatment at 200° C. At this stage, a 35–45% porous coating is obtained. Further elimination of porosity to below 5% would normally require heat treatment above 1000° C., excluding application to most metals in air. However, chemical bonding through phosphating according to the subject invention enables a reduction of the total porosity to less than 3% (open porosity near zero), at temperatures 550° C. or lower.

The small size of the hydrated oxide sol (generally below 10 nm) is critical to provide sufficient reactivity in the presence of chemical bonding agent, e.g. phosphate or phosphoric acid. Dispersing ceramic powders or fibres (oxides, carbides, nitrides or others) into the sol forms the composite sol-gel ceramics. If such calcined ceramic powder particles are dispersed in sol matrix, a dramatic decrease of densification strain results, thereby allowing processing of ceramic coatings and bulk shapes of unlimited size and shape. Simultaneously, the nature of the dispersed phase may be varied independently of the type of the bonding phase, thereby providing a high degree of flexibility in the custom design of ceramics for any given application. However, such ceramics must be further heat treated at relatively high temperatures, i.e. above 1000° C., in order to form ceramic bond and eliminate porosity.

In order to achieve substantially full densification of the body at a temperature below 600° C., an add-on chemical bonding process, according to the invention, is required.

In one example of the invention, the monoaluminum phosphate (MAP), $Al(H_2PO_4)_3$, derived from $Al_2O_3$—$H_3PO_4$—$H_2O$ system, is used along with $H_3PO_4$ to initiate and control the sol phosphating reactions. The following reactions are initiated between sol-derived alumina, calcined alumina and the phosphates:

$$Al_2O_3 + 6H_3PO_4 \rightarrow 2Al(H_2PO_4)_3 + H_2O$$

$$Al(H_2PO_4)_3 \leftrightarrow 2H_3PO_4 + AlPO_4 \cdot H_2O$$

Formation of hydrated aluminum phosphates occurs if excess alumina is present, since $Al(H_2PO_4)_3$ is still capable of reacting, according to the reaction:

$$Al(H_2PO_4)_2 + Al_2O_3 \leftrightarrow 3AlPO_4 + 3H_2O$$

The reaction of orthophosphoric acid with aluminum oxide yields several different products depending on the type of alumina, the composition, reaction time and temperature. The combined effects of specific surface area and alumina concentration determine the kind and relative amounts of phosphates obtained by the reaction at a fixed temperature and time. The preferred system is reaction of the hydrated alumina clusters of several cations of the type $([AlO_4Al_{12}(OH)_{24}(OH_2)_{12}]^{7+})$ with a combination of phosphates and phosphoric acid. Other complex hydrated cations may also participate in the chemical bonding reaction.

CB-CSG technology allows coating of metals, including light metals such as Mg or Al, with well adhering, 50–200 μm thick films for structural or functional applications. Deposition of thick, dense, fully ceramic films is accomplished in a simple painting-low temperature curing operation.

FIGS. 1A, 1B, 1C, 1D, 1E and 1F present SEM microstructures of several alumina/alumina CB-CSG (Chemically Bonded Composite Sol-Gel) coatings, all heat treated at 550° C., at various stages of processing, for example:

(A) dip-coated Composite Sol-Gel (CSG), hardness H=0.5 GPa, substrate/coating bond strength in tension S=3.8 MPa;

(B) dip-coated CSG, surface-sealed with dip-coated pure sol-gel (SG) phase, H=0.8 GPa, S=4.0 MPa;

(C) dip-coated CSG, surface-sealed with pure SG phase by electrophoretic deposition (EPD), H=1.2 GPa, S=5.0 MPa;

(D) dip-coated CSG, surface-sealed with pure SG phase by EPD, followed by chemical bonding through single dip-impregnation with aluminum phosphate/phosphoric acid, H=4.5 GPa, S=20.5 MPa;

(E) dip-coated CSG, followed by chemical bonding through single vacuum-impregnation with aluminum phosphate/phosphoric acid, H=4.2 GPa, S=13.0 MPa;

(F) dip-coated CSG, followed by EPD and chemical bonding through multiple dip-impregnation with aluminum phosphate/phosphoric acid, H=7.4 GPa, S=41.5 MPa.

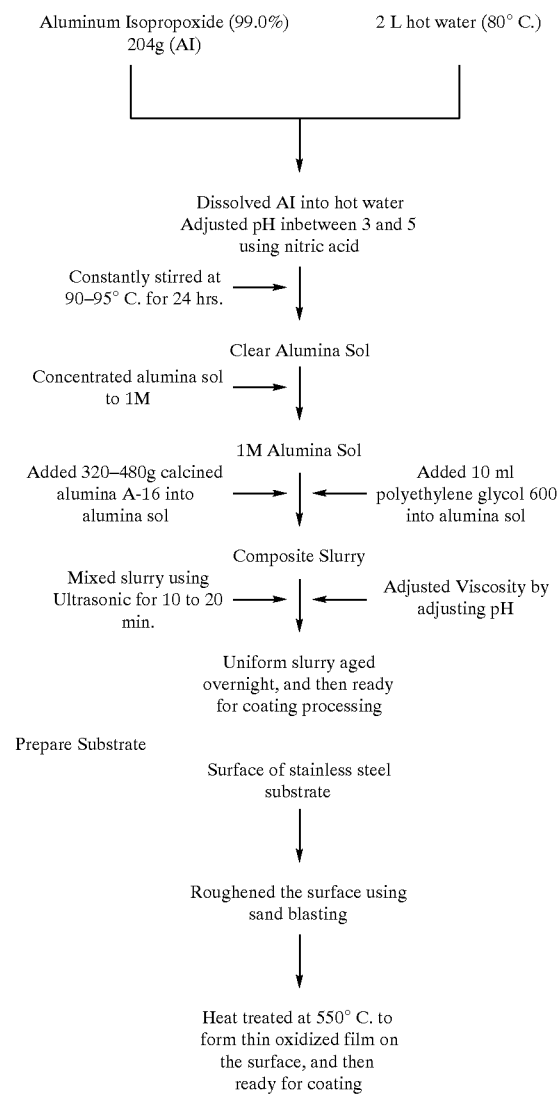

-continued

Dipping Coating Process

The alumina/sol calcined alumina slurry → Substrate

↓

Dip substrate into slurry — Room temperature

↓

Withdraw substrate from slurry — 1–10 cm/min.

↓

Dry at low temperature — 100° C.

↓

Heat treat at 550° C. for 20 min.

Spraying Coating
Spraying coating processing using spraying gun
Post Depositing Treatment of Composite Sol-Gel (CSG) Coating
With alumina sol + phosphoric acid CSG Coating Vacuum CSG Coating for 15 min. →

↓

Dip CSG coating into Alumina sol at the same vacuum condition

↓

Release pressure after 5 min.

↓

Withdraw CSG coating from alumina sol ← Speed: 5 cm/min.

↓

Dry at low temperature ← 100° C.

↓

Heat treat at 550° C. for 10 min.

↓

Brush 86% phosphoric acid on the surface ← Room temperature

↓

Remove the extra phosphoric acid from the surface by scraping in 1–2 min.

↓ heat treat at 250° C. for 20 min.

↓

Heat treat at 600° C.

-continued

If required, the samples can be treated again using phosphoric acid following the same processing.

EXAMPLE 2
Use of Hydrated Alumina Sol as a Bonding Matrix Phase of Alumina/Alumina Composite Sol-gel Ceramic Coatings Aluminum isopropoxide is hydrolyzed in excess water at pH=3 to 5. Calcined aluminum oxide is dispersed in this sol suspension by mixing, followed by ultrasonic agitation to produce a homogenous slurry. The uniform coatings on the substrates were deposited by dip-coating, spin-coating, and spray coating. The single thickness of ceramic coatings is from 6 to 80 $\mu$m. The amount of calcined aluminum oxide in dry coating is about 70 to 90%. The composite sol-gel coatings were dried at 50 to 400° C. and densified at 400 to 900° C. The resulting strength of the composite sol-gel coatings is substantially higher as compared to calcined aluminum oxide only processed in a similar way. For example, after heat treatment at 600° C. for 20 min. in air, the surface hardness of a mix of calcined aluminum oxide and aluminum hydroxide sol is 0.6 GPa, as compared to 0.2 GPa for calcined aluminum oxide processed at identical conditions.

EXAMPLE 3
Use of Hydrated Alumina Sol as a Bonding Matrix Phase of Alumina/Zircona Composite Sol-gel Ceramic Coatings As in the above Example 2, calcined aluminum oxide is dispersed together with zircona particles in the sol suspension through hand mixing, followed by ultrasonic agitation. The amount of calcined aluminum oxide plus zirconia is about 80 to 90% of calcined solids. The processing is similar as in the above Example 2. The resulting strength of the composite sol-gel coatings of the calcined aluminum oxide/zirconium oxide plus aluminum hydroxide sol is substantially higher as compared to calcined aluminum oxide/zirconium oxide only, processed in similar way. For example, after heating at 600° C. for 20 min. in air, the surface hardness of the mix of calcined aluminum oxide/zirconium oxide plus aluminum hydroxide sol is 0.6 GPa, as compared to 0.2 GPa of calcined aluminum oxide/zirconium oxide processed at identical conditions.

EXAMPLE 4
Use of Hydrated Alumina Sol to Seal Open Porosity of Ceramic Coatings and/or Bulk Materials This method involves the densification of ceramic coatings by infiltration of the open pores with sol-gel ceramic precursors. As in the above Example 2, alumina sol with 0.5 to 3 M concentration was prepared. The viscosity of alumina sol was controlled by adjusting pH. The impregnation of the coating with the sol was carried out at room temperature in a vacuum chamber. After impregnation, the samples were dried at 50 to 300° C. for 1 to 5 hours and densified at 400 to 900° C. for 10 to 30 min. The processes mentioned above could be repeated several times as required. As a result, the gas permeability decreases 93% compared to untreated ceramic coatings.

EXAMPLE 5
Use of Hydrate Alumina Sol to Seal Open Porosity of Ceramic by Electrophoretic Deposition (EPD).

Figure 2:
FIG. 2 illustrates a micrograph of a ceramic coating prepared according to the procedure in Example 5.

As in the above Example 2, 0.5 to 3 M alumina sol was subject to electrophoretic deposition. Viscosity of the alumina sol was controlled by adjusting pH. In the electrophoresis setup, a constant potential was applied across two electrodes immersed in alumina sol. For example, the cathode was a porous ceramic coating on the metallic substrate and platinum was used as anode. The deposition process was preformed at 0.3 to 3 V (dc constant voltage) for 10 to 40 min. After EPD impregnation, the samples were dried at 50 to 300° C. for 1 to 5 hours and densified at 400 to 900° C. for 10 to 30 min. As a result, the porous ceramic coatings were coated by a thin film (1 to 5 $\mu$m) with no open porosity, as illustrated in FIG. 2. The gas permeability decreases to 98% as compared to untreated ceramic coatings.

EXAMPLE 6

Use of Hydrate Alumina Composite Sol to Seal Open Porosity of Ceramic Coatings and/or Bulk Materials This method involves the densification of porous ceramic coatings or bulk materials by infiltration of their open pores with alumina composite sol. As in Example 4 above, calcined alumina powder was dispersed into alumina sol through hand mixing, followed by ultrasonic agitation to produce homogenous slurry. The amount of aluminum oxide is about 50 to 80% of the solid. After impregnation, the samples were dried at 50 to 300° C. for 1 to 5 hours and densified at 400 to 900° C. for 10 to 30 min. As a result, the gas permeability of impregnated porous body decreases 95% as compared to untreated body. If alumina sol is absent from the composition, the coating has 40–50% open porosity, which makes the coating useless for wear and corrosion protection.

EXAMPLE 7

Use of Mono-alumina Phosphate to Seal the Open Porosity of Ceramic Coatings and/or Bulk Materials.

Figure 3:
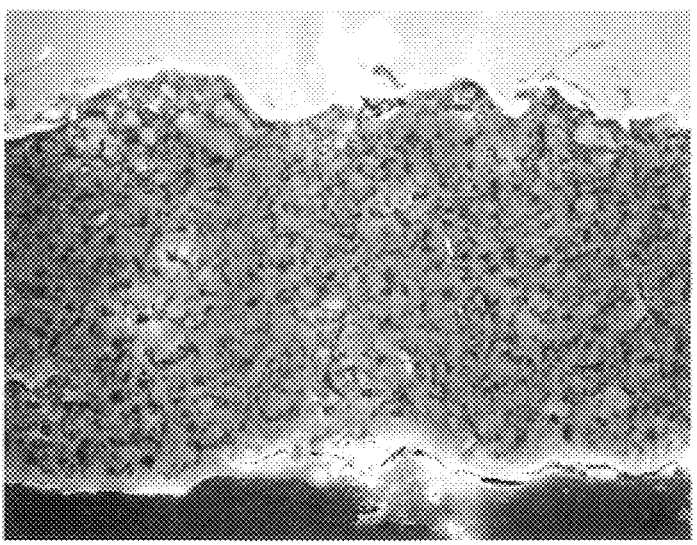
FIG. 3 illustrates the microstructure of a composite sol-gel ceramic coating treated with mono-alumina phosphate as produced by the process in Example 7.

The procedure in Example 2 was followed. The porous ceramic coatings or ceramic bulk materials were impregnated with mono-aluminum phosphate for 10 to 50 min. The impregnated samples were polymerized at 100 to 300° C. for 20 to 50 min. and then heat treated at 500 to 800° C. for 10 to 50 min. As a result of this process, surface microhardness of ceramic coating treated with mono-aluminum phosphate increases from 0.2 GPa to 2.2 GPa as compared to untreated ceramic coatings. The open porosity decreases by 95% as compared to untreated ceramic coatings. The SEM picture (FIG. 3) shows microstructure of the composite sol-gel ceramic coating treated with mono-alumina phosphate. If alumina sol is absent from the composition, phosphates penetrate and react with the metal substrate, leading to separation of the coating from the substrate.

EXAMPLE 8

Figure 4:
FIG. 4 illustrates the microstructure of a composite sol-gel ceramic coating treated with phosphorus acid prepared according to the procedure in Example 8.

Use of Phosphoric Acid to Seal Composite Sol-gel Ceramic Coatings or Bulk Materials After the Samples were Treated with Alumina Sol, Alumina Composite Sol, Mono-alumina Phosphate, and/or EPD The hydrated alumina sol is subject to reaction with phosphoric acid to result in a polymerized network of mono-alumina phosphate. This application is especially suitable for adding structural integrity to the surface of porous bodies or coatings. The hydrated alumina sol reacts rapidly with phosphoric acid, such that the underlying metallic substrate is not exposed to damaging phosphating reactions. As in the above Example 4, composite sol-gel ceramic coatings treated by alumina sol were impregnated by phosphoric acid for 1 to 20 min., and then were polymerized at 100 to 300° C. for 20 to 50 min. and then heat treated at 500 to 800° C. for 10 to 50 min. As a result of this process, surface microhardness of ceramic coating treated by phosphate acid increased from 0.5 GPa to 6.4 GPa compared to untreated ceramic coatings. The open porosity decreased by 99% as compared to untreated ceramic coatings. The bonding strength between ceramic coating and substrate increased from 4 MPa to more than 21 MPa as compared to untreated coatings. FIG. 4 shows the microstructure of composite sol-gel ceramic coating treated with phosphoric acid.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

References

1. Q. Yang and T. Troczynski, "Composite Alumina Sol-Gel Ceramics", Proceeding of the Symposium on Sol-Gel Processing, at 100th annual convention of American Ceramic Society, Cincinnati, May 1998 and accepted for publication in proceedings of the congress. Published March 1999.
2. Q. Yang and T. Troczynski, "Dispersion of Alumina and Silicon Carbide Powders in Alumina Sol", approved for publication in *J. Am. Ceram. Soc.*, 1999.
3. Q. Yang and T. Troczynski, "Alumina Sol—Assisted Sintering of Alumina-Silicon Carbide Composites", approved for publication in *J. Am. Ceram. Soc.*, 1999.
4. T. Troczynski and Q. Yang, "Composite Sol Gel Ceramics", presented at 101 Annual Meeting of American Ceramic Society, Indianapolis, April 1999
5. C. J. Brinker and G. W. Sherer, "Sol Gel Science", Academic Press, San Diego, 1990.
6. C. J. Brinker et al, "Sol-Gel Derived Ceramic Films—Fundamentals and Applications", pp. 112–151 in "Metallurgical and Ceramic Protective Coatings", Ed. K. Stem, Chapman & Hall, London, 1996.
7. C. W. Turner, "Sol Gel Process—Principles and Applications", *Am. Cer. Soc. Bull.* 70 (1991) 1487.
8. G. Yi and M. Sayer, "Sol Gel Processing of Complex Oxide Films", *Am. Cer. Soc. Bull.* 70 (1991) 1173.
9. L. Shaw and R. Abbaschian, "$Al_2O_3$ Coatings as Diffusion Barriers Deposited from Particulate Containing Sol-Gel Solutions", *J. Am. Cer. Soc.* 78 (1995) 3376.
10. D. A. Barrow, T. E. Petroff and M. Sayer, "Thick Ceramic Coatings using a Sol Gel Based Ceramic—Ceramoc 0–3 Composite:, *Surf Coat. Tech.*, 76–77 (1995) 113.
11. D. Kingery, "Fundamental Study of Phosphate Bonding in Refractories, Part I,II,III", *J. Am. Cer. Soc.* 33 (1950) 239–50.
12. J. Cassidy, "Phosphate Bonding Then and Now", *Am. Cer. Soc. Bull.* 56 (1977) 640–43.
13. J. Bothe and P. Brown, "Low Temperature Formation of Aluminum Orthophosphate", *J. Am. Cer. Soc.* 76 (1993) 362–68.
14. J. Bothe and P. Brown, "Reactivity of Alumina towards Phosphoric Acid", *J. Am. Cer. Soc.* 76 (1993) 2553–58.

Patents

15. D. A. Barrow, T. E. Petroff and M. Sayer, U.S. Pat. No. 5,585,136.
16. U.S. Pat. No. 5,591,381, "Preparation of Alumina—silica sol-gel compositions".
17. U.S. Pat. No. 5,595,945, "Ceramic composite coating".
18. U.S. Pat. No. 5,035,724, "Sol-gel alumina shaped bodies".

19. U.S. Pat. No. 5,439,851, "Process for coating ceramic powder with alumina by sol-gel process and improved densification".
20. U.S. Pat. No. 5,516,388, "Sol-gel bonding".
21. U.S. Pat. No. 4,927,673, "Rapid technique for making improved laminar ceramic shell molds using a phosphate modified aluminum salt binder".
22. U.S. Pat. No. 5,178,846, "Method for the preparation of wide-pore crystalline aluminophosphate molecular sieve".

What is claimed is:

1. A process of preparing a chemically bonded sol-gel ceramic comprising:

(a) preparing an oxide or hydrated oxide ceramic from a sol-gel process;

(b) impregnating the oxide or hydrated oxide ceramic with a phosphating agent to produce system components; and (c) heat treating the system components at a temperature between about 300° C. and about 1200° C. to produce a chemically bonded sol-gel ceramic.

2. A process as claimed in claim 1 wherein the oxide or hydrated oxide ceramic prepared using the sol-gel process is a first phase and the oxide or hydrated oxide ceramic in the first phase is impregnated with a secondary phosphate phase which reacts with the oxide or hydrated oxide ceramic first phase.

3. A process as claimed in claim 2 wherein the first phase is a mixture of calcined alumina and alumina prepared using a sol-gel process, which mixture is impregnated with the second phase comprising a mixture of metal phosphate and phosphorus acid to form complex amorphous or crystalline phosphates under heat treatment according to step (c).

4. A process as claimed in claim 1 wherein the oxide or hydrated oxide ceramic can be one or more of $SiO_2$, $Al_2O_3$, $ZrO_2$, $TiO_2$, BeO, SrO, BaO, CoO, NiO, ZnO, PbO, CaO, MgO, $CeO_2$, $Cr_2O_3$, $Fe_2O_3$, $Y_2O_3$, $Sc_2O_3$, $HfO_2$ or $La_2O_3$.

5. A process as claimed in claim 1 wherein the phosphating agent is a metal phosphate, phosphoric acid, or mixtures thereof.

6. A process as claimed in claim 5 wherein the metal phosphate comprises a metal selected from one or more of Al, Zr, Ti, Mg, Cu, Fe, Ca, Sr, Hf or Cr.

7. A process as claimed in 4 wherein a calcined ceramic filler comprised of powders or fibres of oxides, carbides, nitrides, borides, sulphides or mixtures thereof is incorporated in the chemicallly bonded sol-gel ceramic.

* * * * *